(12) United States Patent
Gooding et al.

(10) Patent No.: US 7,852,855 B1
(45) Date of Patent: Dec. 14, 2010

(54) METHOD FOR CONTROLLING MULTI-USER TCP/IP ACCESS OVER A SATELLITE COMMUNICATION CHANNEL

(75) Inventors: Charles Peter Gooding, San Diego, CA (US); David J. Aitken, Rimforest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 840 days.

(21) Appl. No.: 11/757,710

(22) Filed: Jun. 4, 2007

(51) Int. Cl.
*H04L 12/28* (2006.01)
*H04L 12/56* (2006.01)
*H04B 7/00* (2006.01)
*H04B 7/185* (2006.01)
*H04B 7/212* (2006.01)
*H04B 1/034* (2006.01)
*H04B 1/18* (2006.01)
*H04W 4/00* (2009.01)
*H04W 72/00* (2009.01)
*H04W 40/00* (2009.01)

(52) U.S. Cl. .............. 370/395.42; 370/277; 370/316; 370/322; 370/395.2; 370/395.41; 370/237; 455/427; 455/98; 455/180.2; 455/188.2; 455/452.2; 455/512; 455/428

(58) Field of Classification Search ......... 455/427, 455/98, 180.2, 188.2, 450–453, 512, 428; 370/277, 316, 322, 395.2–395.43, 237
See application file for complete search history.

(56) References Cited

U.S. PATENT DOCUMENTS

| | | | | |
|---|---|---|---|---|
| 6,314,087 | B1 * | 11/2001 | Oh | 370/252 |
| 6,381,228 | B1 * | 4/2002 | Prieto et al. | 370/323 |
| 6,523,098 | B1 * | 2/2003 | Anderson | 711/158 |
| 2003/0210660 | A1 * | 11/2003 | Wiberg et al. | 370/320 |
| 2005/0009467 | A1 * | 1/2005 | Nuber | 455/12.1 |

\* cited by examiner

*Primary Examiner*—Jinsong Hu
*Assistant Examiner*—Mong-Thuy Tran
(74) *Attorney, Agent, or Firm*—Ryan J. Friedl; Kyle Eppele

(57) ABSTRACT

A method is provided for controlling TCP/IP access includes receiving a request from a requestor for data transmission over a satellite communication channel, determining whether the request for data transmission has collided with a separate request for data transmission, if the request for data transmission has collided with a separate request for data transmission, then accepting the request for data transmission, else, temporarily denying the access to the satellite communication channel, determining the priority of the requestor and the number of users on the satellite communications channel, determining the access to the satellite communication channel of the requestor based on the priority of the requestor and the number of users on the satellite communication channel, and monitoring access to the satellite communication channel based on the priority of the requestor and the number of users on the satellite communication channel.

18 Claims, 7 Drawing Sheets

METHOD FOR CONTROLLING MULTI-USER TCP/IP ACCESS OVER A SATELLITE COMMUNICATION CHANNEL

FEDERALLY-SPONSORED RESEARCH AND DEVELOPMENT

The Method for Controlling Multi-User TCP/IP Access Over a Satellite Communication Channel was developed with Federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 97566.

BACKGROUND

Over the last decade there has been a critical need to provide remote users a native transmission control protocol/internet protocol (TCP/IP) link across ultra-high frequency satellite communications (UHF SATCOM), especially among military service branches. For many users (troops, small ships, submarines, aircraft and others) UHF SATCOM is the only available radio frequency (RF) path. While there have been attempts to provide products with such capability, these products are not interoperable with other products. Further, the products have limited capabilities and other drawbacks.

Therefore, there is a current need for a protocol that may provide multi-user TCP/IP access across UHF satellite communications and that may operate on low bandwidth, handle long-latency communication, operate with half-duplex communications, and provide a high channel quality.

DETAILED DESCRIPTION OF SOME EMBODIMENTS

Figure 1:
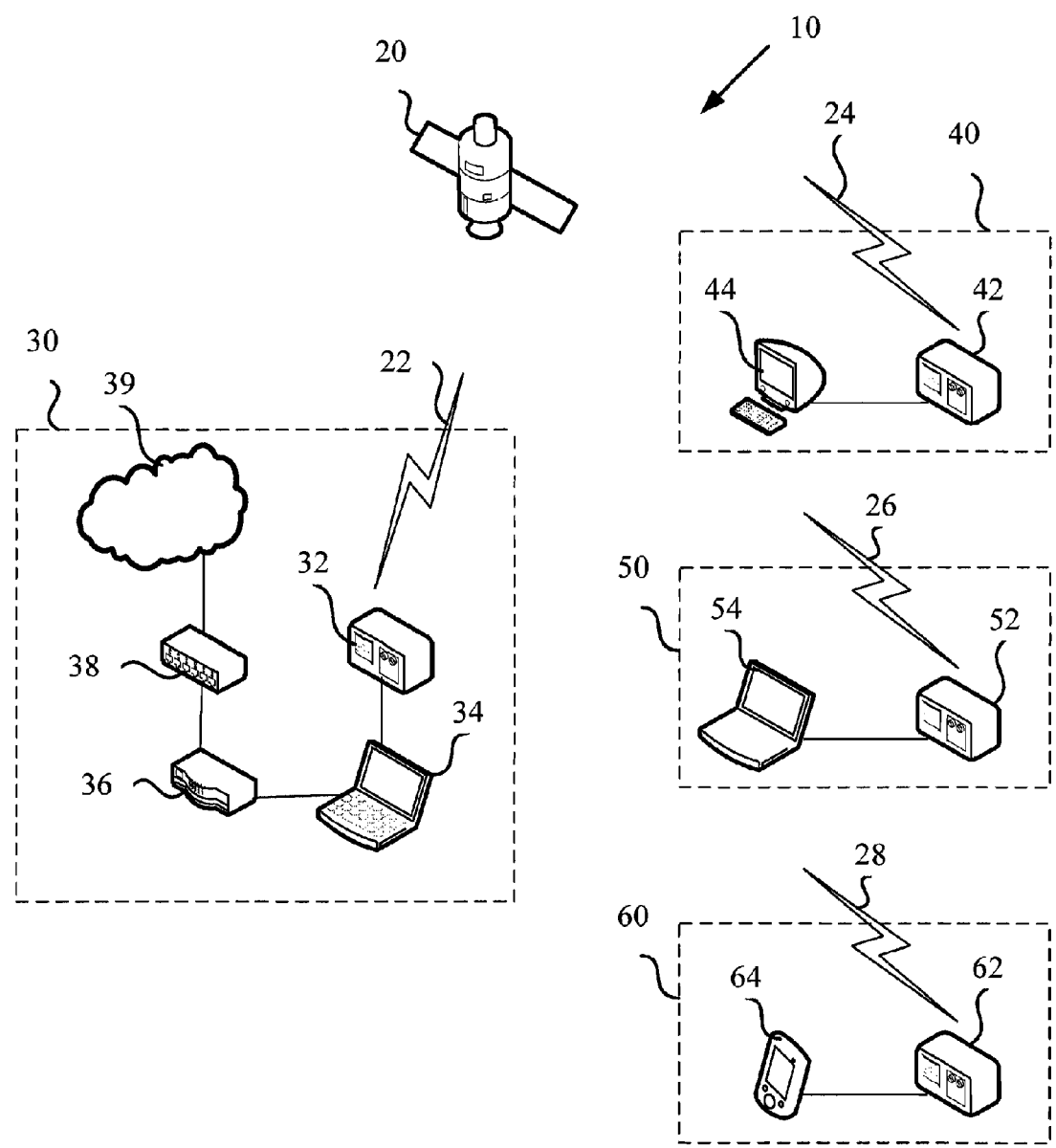
FIG. 1 shows a of diagram of a system that may be configured for the implementation of an embodiment of the method for controlling multi-user TCP/IP access over a satellite communication channel.

Referring to FIG. 1, there is shown a diagram of a system 10 that may be configured for the implementation of an embodiment of the method for controlling multi-user TCP/IP access over a satellite communication channel. System 10 includes satellite 20, afloat site 30, shore site 40, shore site 50, and shore site 60. Satellite 20 may be a UHF satellite. Afloat site 30 may be a ship, submarine, or other floating vessel. Afloat site 30 may include a transceiver 32, a computer 34, a router 36, a switch 38, and a local area network (LAN) 39. Router 36 and switch 38 may comprise any commercially available products that meet the specifications of system 10. Afloat site 30 may communicate with satellite 20 by communication link 22 via transceiver 32. As shown, computer 34 is a laptop system. Shore site 40 may include a transceiver 42 and a computer 44. As shown, computer 44 is a desktop system. Shore site 40 may communicate with satellite 20 by communication link 24 via transceiver 42. Shore site 50 may include a transceiver 52 and a computer 54. As shown, computer 54 is a laptop system. Shore site 50 may communicate with satellite 20 by communication link 26 via transceiver 52. Shore site 60 may include a transceiver 62 and a computer 64. As shown, computer 64 is a handheld device. Shore site 60 may communicate with satellite 20 by communication link 28 via transceiver 62.

Transceivers 32, 42, 52, and 62 may comprise lightweight, secure, network capable, anti-jam, voice/imagery/data communications capable, multi-band, multi-mission communication terminals with capabilities for ultra high frequency/very high frequency (UHF/VHF), manpack line of sight (LOS), and satellite communications/demand assigned multiple access (SATCOM/DAMA). The number of transceivers 32, 42, 52, and 62 residing on either afloat site 30, shore site 40, shore site 50, or shore site 60 may depend on the number of simultaneous channels required for the particular site. For example, afloat site 30 may be a large ship requiring the use of ten to twelve transceivers 32 to accommodate heavy traffic flow, whereas shore site 60 may be a single user in the field using handheld device 64 to communicate, requiring only a single transceiver 62.

The type of computers 34, 44, 54, and 64 used with system 10 may be any of the commercially available computing devices meeting the system requirements and having the necessary communication capabilities. The method for controlling multi-user TCP/IP access over a half-duplex, low-bandwidth, ultra-high frequency satellite communication channel may optimally perform on a computer 34, 44, 54, and 64 having either a Pentium III 800 MHz or better processor running Linux Red Hat 7.3 or a Windows 2000 operating system with a Pentium III 1 GHz or better processor. Interfaces for the installed configuration are limited to a synchronous serial port and an Ethernet port. The serial port routes data to a type-1 encryption device or embedded cypto in a manpack, which is then routed to a radio for transmission. The Ethernet port connects the method for controlling multi-user TCP/IP access over a half-duplex, low-bandwidth, ultra-high frequency satellite communication channel to the LAN that it services. Other hardware interfaces, such as a disk drive, universal serial bus (USB), and keyboard-video-mouse (KVM) can be utilized with computers 34, 44, 54, and 64 depending on the hardware selected to host the method. The configured computer system may include non-volatile storage in the form of a hard disk drive (HDD), which stores the operating system, the method software, and buffered user data as well as logging of operations, configurations, and chat files.

The method for controlling multi-user TCP/IP access over a satellite communication channel may be operated via a Hyper Test Markup Language (HTML) graphical user interface (GUI). The method may have an embedded HTML server that serves the GUI to the LAN that it is connected with. A user of the method may be able to access the system GUI from any LAN connected personal computer (PC) with a web browser. The system may have four levels of access: administrator, operator, monitor, and chat, which includes the monitor function. System 10 may also be configured to require user identification and strong password authentication.

Figure 2:
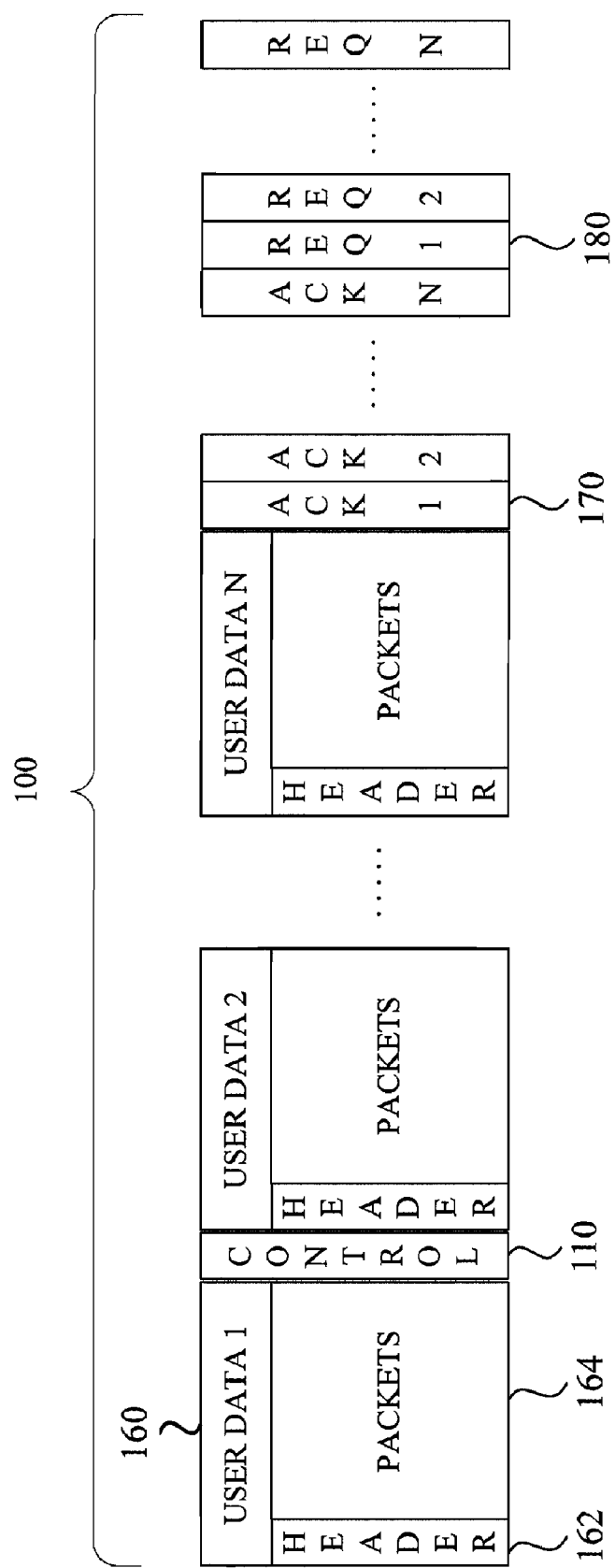
FIG. 2 shows a block diagram of an example of a cycle generated by an embodiment of the method for controlling multi-user TCP/IP access over a satellite communication channel.

FIG. 2 shows a block diagram of a cycle 100 generated by an embodiment of the method for controlling multi-user TCP/IP access over a satellite communication channel. Each cycle 100 may consist of several frames arranged in a particular order based on the information contained in a control frame 110. In the example of an arrangement of frames shown in the figure, cycle 100 may include one or more control frames 110, one or more data frames 160, one or more acknowledgement frames 170, and one or more request frames 180. Data frames 160 may be grouped together into data slots (not shown) for allocated stations to use for one or more BURSTs of MIL-STD-188-184 messages to one or more destinations. Data frames may contain a header 162 and data packets 164. Acknowledgement frames 170 may be extensions of the MIL-STD-188-184 acknowledgement frames. Acknowledgement frames 170 may include a flag indicating that the acknowledging station has data to send and requests a data slot allocation. Timing for acknowledgements in a multicast environment may follow those set forth in MIL-STD-188-184, where possible within the confines of the number of acknowledgement frames 170 per data slot parameter. Request frames 180 may be comprised of standard MIL-STD-188-184 Probe Acknowledgements destined to the controlling station. Request frames 180 may be used to indicate that the station has data to transmit and is requesting a data slot allocation.

Requests for a data slot may be made from any station to the controlling station. Requests for data slots can be made in several ways, including by: 1) setting a flag in an acknowledgement frame in response to another station's data slot; or 2) generating a request frame at the end of a cycle. Stations that have one or more data slots may have them de-allocated. De-allocation may occur in several ways, including by: 1) setting a flag in a data slot header indicating they no longer need the data slot, 2) being superseded by one or more higher priority stations, or 3) arbitrarily by the controlling station as needed. The controlling station may arbitrate requests to: 1) produce the map of allocations for the cycle after next using an algorithm that attempts to balance load among users, and 2) ensure that higher-priority stations always receive preferential access to the network without completely restricting lower-priority stations.

Figure 3:
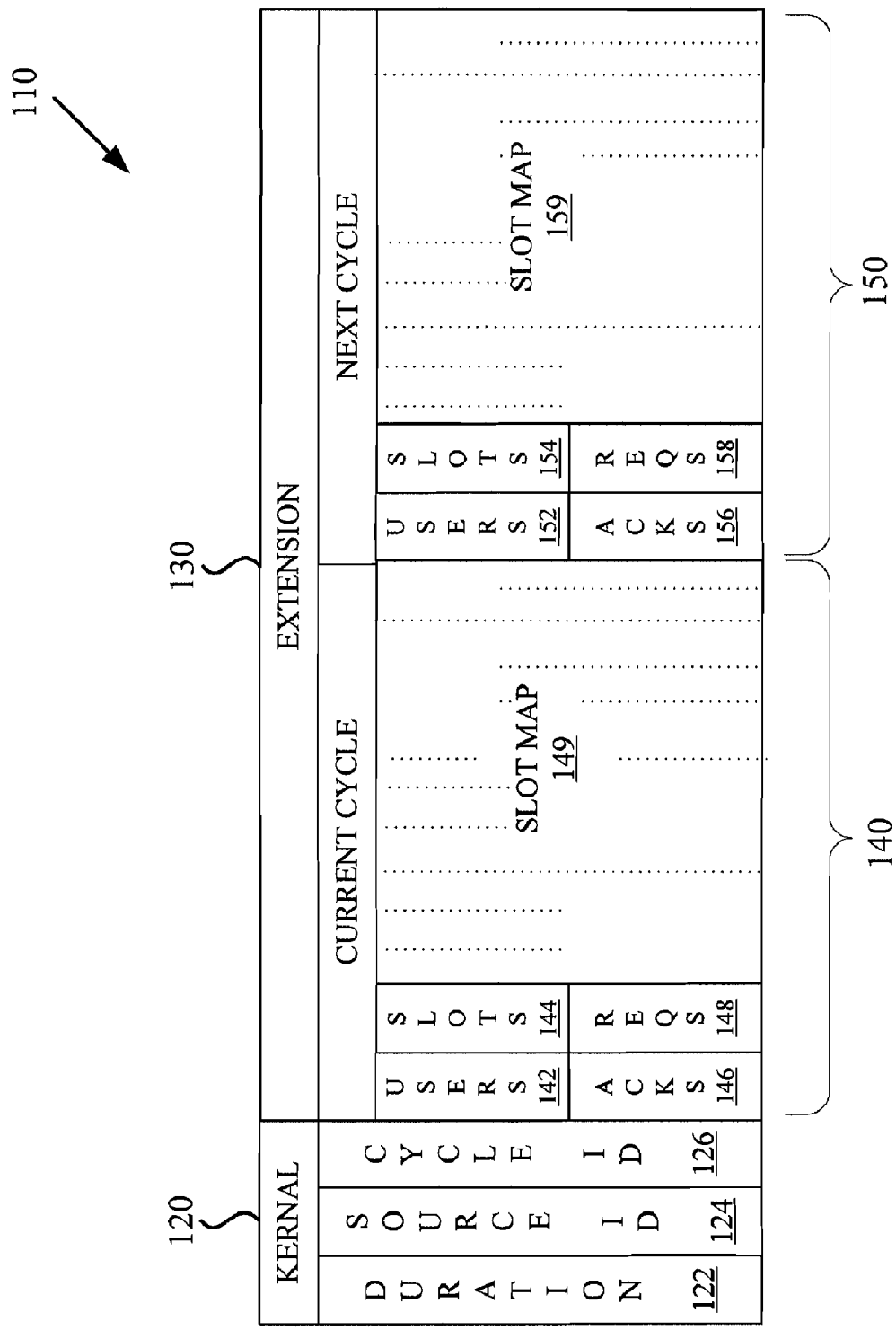
FIG. 3 shows a block diagram of an example of one embodiment of a control frame for use within an embodiment of the method for controlling multi-user TCP/IP access over a satellite communication channel.

FIG. 3 shows an example of one embodiment of a control frame 110. In one implementation, control frames 110 may be derived from the MIL-STD-188-184 probe frame. Control frames 110 may include a kernel portion 120 and an extension portion 130. Kernel portion 120 may include duration parameters 122, source identification parameters 124, and cycle identification parameters 126. Extension portion 130 may include parameters for the current cycle 140 and the next cycle 150. Parameters of current cycle 140 may include the number of users 142, available slots 144, acknowledgements 146, and requests 148, as well as a data slot allocation map 149. Parameters of next cycle 150 may include the number of users 152, available slots 154, acknowledgements 156, and requests 158, as well as a data slot allocation map 159. Data slot allocation maps 149 and 159 may indicate the number of adjacent data slots that each allocated station may use for transmission.

Table 1 below shows configuration parameters that may be maintained by the controlling station (not shown) to determine how the controlling station generates control frames 110 for each cycle 100.

TABLE 1

CONFIGURATION PARAMETERS

| NAME | DESCRIPTION | RANGE | DEFAULT |
|---|---|---|---|
| Data Rate | Communication speed of serial interface | 1,200-1,544,000 bps | 57,600 bps |
| Cycle Duration | Maximum Cycle Duration | 100-65,536 ms | 16000 ms |
| Maximum Slots | Maximum data slots in a cycle | 1-16 | 16 |
| Controlling Station ID | Station ID of controlling station | 1-64 | 1 |
| ACKs per Slot | Number of ACK frames per data slot | 0-3 | 1 |
| Requests per Cycle | Number of REQ frames per cycle | 0-3 | 2 |
| Reclamation Count | Number of cycles of inactivity before an allocated data slot is reclaimed for re-allocation | 0-10 | 2 |
| Transmit Lead Time | Satellite uplink delay that can be saved by early transmission | 0-500 ms | 200 ms |

Figure 4:
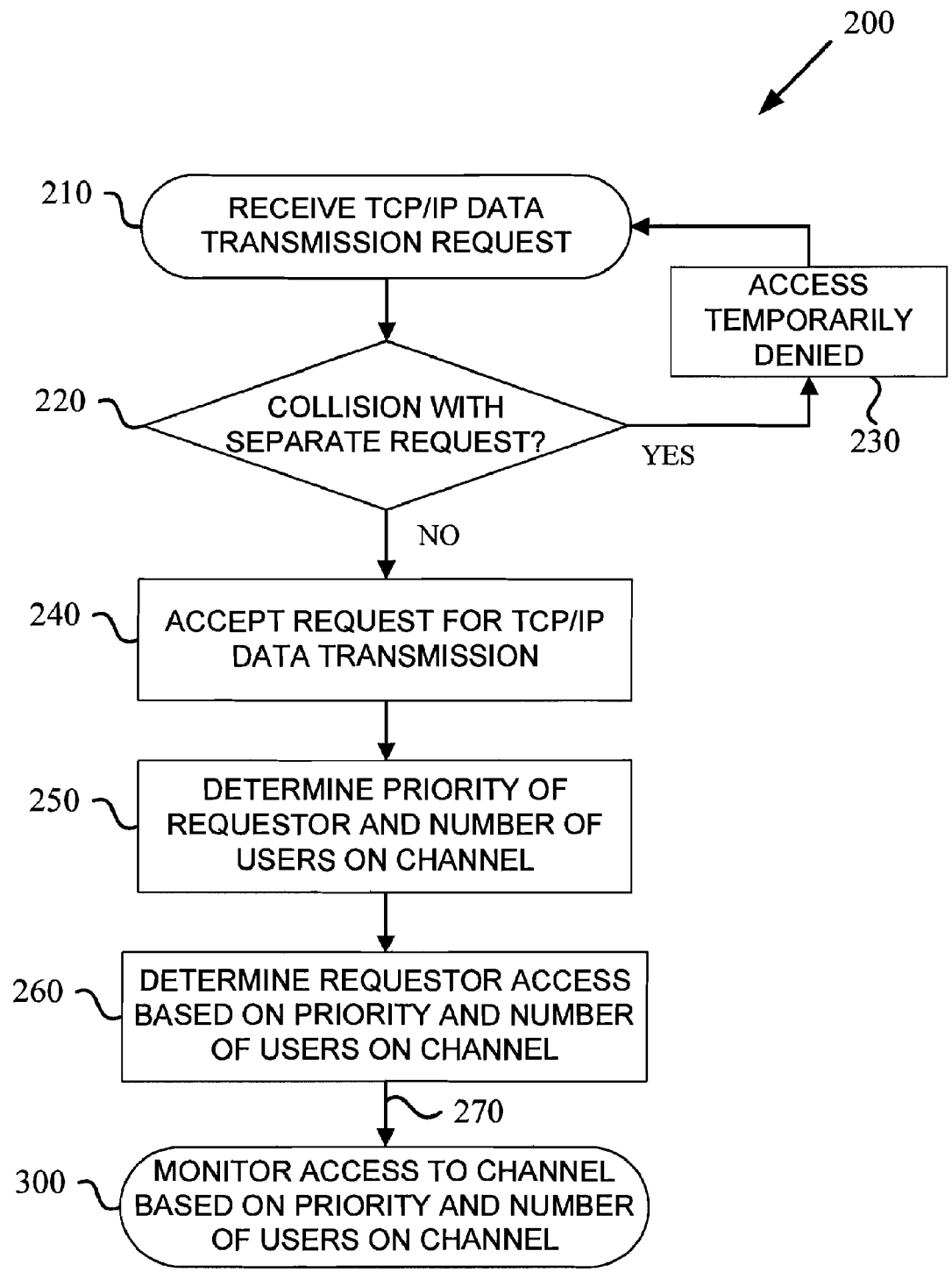
FIG. 4 shows a flow diagram of an embodiment of the method for controlling multi-user TCP/IP access over a satellite communication channel.

FIG. 4 shows a flow diagram of an embodiment of the method for controlling multi-user TCP/IP access over a satellite communication channel 200. By way of example, the satellite communication channel can have a bandwidth of 9600 baud to 38 kbps and can have a latency of 150 ms to 180 ms to send and receive data. Also, the satellite communication channel can be a half-duplex, low-bandwidth, ultra-high frequency channel using a TDMA controller. Method 200 may begin at step 210, where a TCP/IP data transmission request is received by a controller. A request refers to a request for data slot allocation from the network controller. Requests may be received from various sources, including ground based requestors and requestors located on crafts such as ships, submarines, and airplanes. To submit a request, a requestor may utilize a laptop, personal computer, hand-held device, or other device having a modem and an operating system capable of running a software implementation of the method for controlling multi-user TCP/IP access and transmitting the request to the appropriate satellite receiver. The device can reside on a local area network or a wide area network, depending on the level of monitoring and control desired.

Following step 210, method 200 may proceed to step 220 where it is determined whether a collision has occurred between the TCP/IP data transmission request and another separate TCP/IP data transmission request from another requestor. A collision may occur when two requests are received by the controller at the same time. In one implementation, each requestor making a request for data slot allocation from the controller may randomly select from the available request slots each cycle. The requestor may then monitor the next control frame to see if the request was successfully received. If the request was not received, the requestor may continue to transmit requests, incorporating into their random selection a "back-off" factor that may increase on each failed request attempt. This factor may be used to weight the requestor's random number generator to provide for a higher probability of skipping a cycle completely, thus attempting to avoid the potential of a collision with another request. If a collision occurs, method 200 may proceed to step 230. At step 230, method 200 temporarily denies the requestor access to the satellite communication channel for a predetermined time interval, for example two seconds.

If there is no collision at step 220, method 200 continues to step 240, where the request for TCP/IP data transmission is accepted. After step 240, method 200 proceeds to step 250, where the priority of the requestor and the number of users presently on the communication channels are determined. Each requestor's priority may be determined from the priority given in the requestor's REQ frame. Following step 250, method 200 may terminate at step 260, where the requestor's access to the satellite communication channel is determined based on the requestor's priority and the number of users on the communication channel. At step 260, the priority of each requestor may be compared against other requestors. After step 260, method 200 concludes at step 300, where method 200 monitors access to the satellite communication channel based on the priority of the requestor and the number of users on the satellite communication channel.

Figure 5:
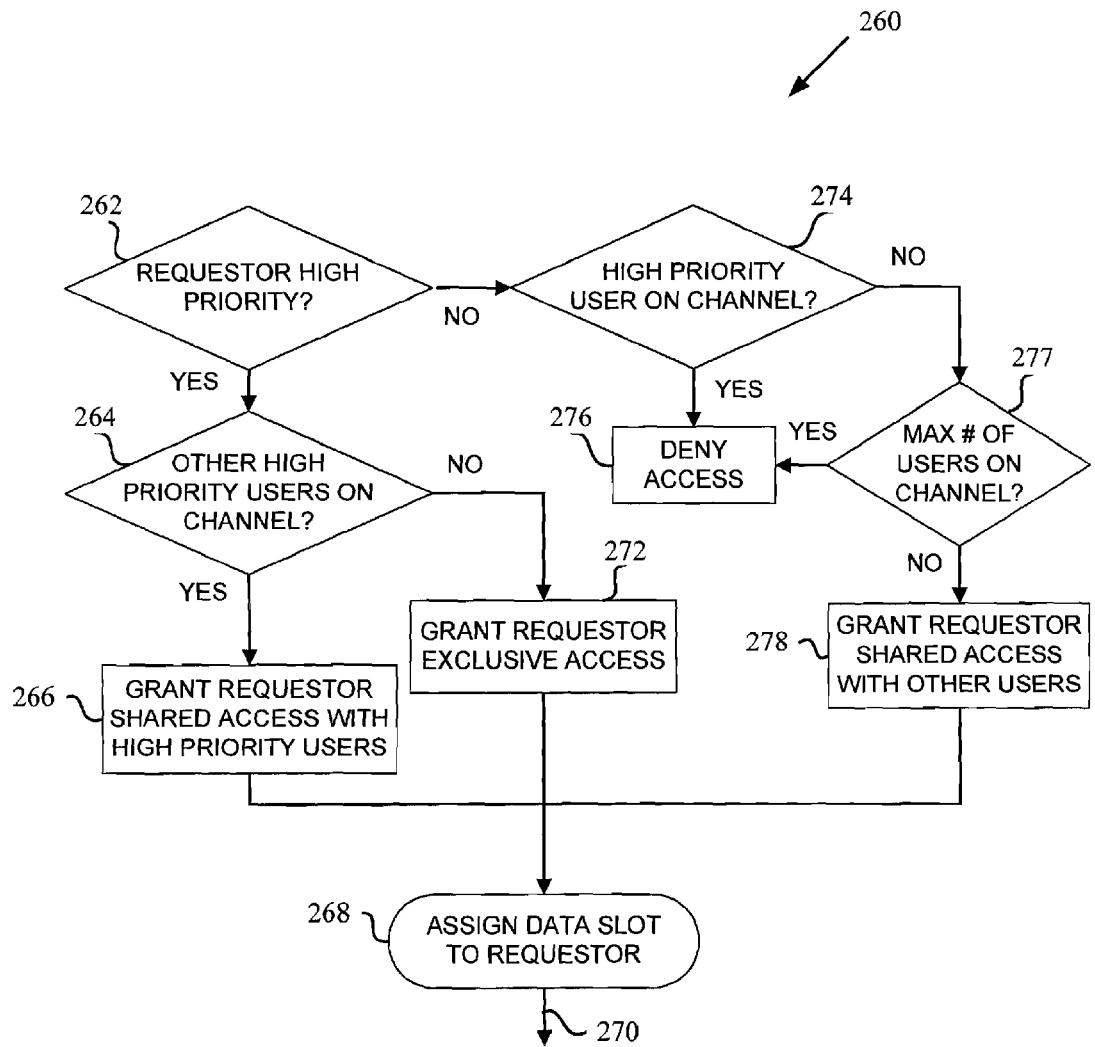
FIG. 5 shows a flow diagram of an embodiment of the step of determining a requestor's access to the satellite communication channel according to an embodiment of the method for controlling multi-user TCP/IP access over a satellite communication channel.

FIG. 5 shows a flow diagram of an embodiment of step 260 of method 200. Step 260 may begin at step 262, where it is determined whether the requestor has a high priority. If it is determined at step 262 that requestor has a high priority, step 260 proceeds to step 264 to make a determination whether other high priority users are on the satellite communication channel. As an example, high priority requestors may be defined as those users that issue requests with a priority level of 1. If the network is configured to grant high priority users sole access, then lower priority users will not be given any resources, otherwise they will be given resources only after all higher priority requests have been satisfied.

The satellite communication channel may contain requestors with varying priority levels. The priority levels can be allocated according to type of requestor, location of requestor, or any other characteristic of the requestor. In some embodiments, the priority levels may relate only to resource allocation, not the importance of the data to be transmitted. However, other embodiments of the method may contain priority levels for data importance in addition to or in place of resource allocation priority. By way of example, the method can contain requestor priority levels of low, medium, and high. In other embodiments, a priority level of "none" can also be assigned, where the method can use the priority of "none" to retract a previous grant of network access. The requestors with higher priority may gain access to the channel over requestors with lower priority. Requestors with equal priority may gain access to the channel based upon first request received. If a high priority user is on the satellite communication channel, then step 266 involves granting the requestor access to the satellite communication channel, wherein the access to the satellite communication channel is shared among the requestor and the high priority user. Following step 266, step 260 may conclude at step 268, where a data slot may be assigned to the requestor. Step 268 is explained in more detail with respect to FIG. 6. If, at step 264, it is determined that a high priority user is not on the satellite communication channel, then step 260 proceeds to step 272, where the requestor is granted exclusive access to the satellite communications channel. Following step 272, step 260 may proceed to step 268.

Referring back to step 262, if the requestor does not have a high priority, step 260 may proceed to step 274. At step 274 it is determined whether a high priority user is on the satellite communication channel. If a high priority user is on the satellite communication channel, then step 276 involves denying the requestor access to the satellite communication channel. If a high priority user is not on the satellite communication channel, then step 260 may proceed to step 277, where a determination is made as to whether the maximum number of users are on the satellite communication channel. The maximum number of users is established at network setup time. For example, the maximum number of users is generally between 4 and 8. In other implementations, the maximum number of users may be as low as 1 and as high as 16. The maximum number of users allowed on the satellite communication channel may be predetermined according to the capabilities of the equipment utilized for the channel and the type of data to be transmitted over the channel. As an example, the minimum number of users allowed on the channel may be eight.

Some embodiments of the channel may include capabilities for allowing passive users to listen and receive broadcasts on the channel, but not to transmit. If at step 277, it is determined that the maximum number of users allowed on the channel is reached, access to the channel may be denied to the requestor at step 276. If the maximum number of users allowed on the channel is not reached, step 260 may proceed to step 278, where the requestor may be granted assess to the channel. In this case, the requestor's access to the satellite communication channel may be shared among the requestor and the lower priority users, with each user receiving the same amount of access to the channel. Following step 278, step 260 may proceed to step 268 to assign a data slot to the requestor and then proceed to step 300 along flow path 270.

Figure 6:
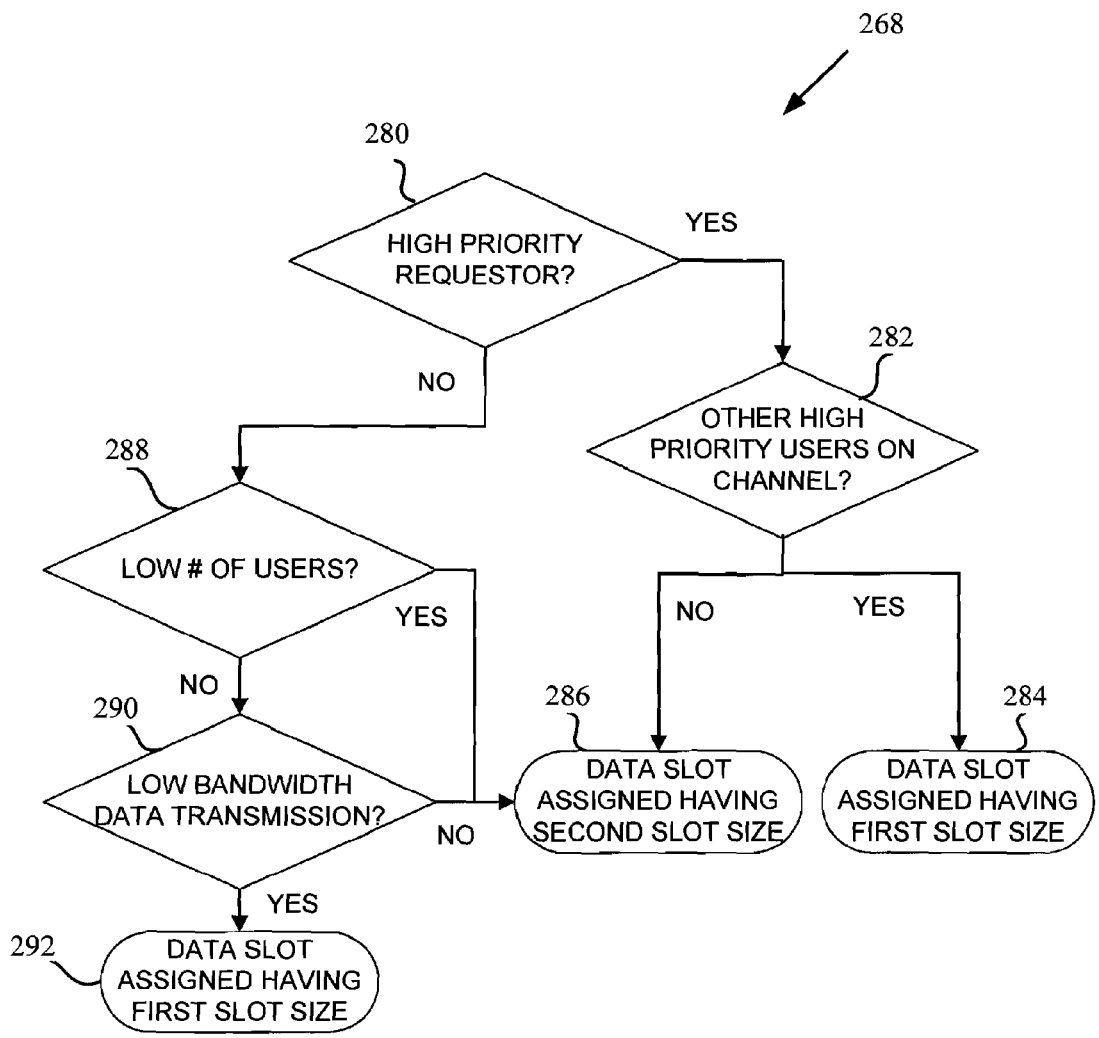
FIG. 6 shows a flow diagram of an embodiment of the step of assigning a data slot to a requestor according to an embodiment of the method for controlling multi-user TCP/IP access over a satellite communication channel.

FIG. 6 shows a flow diagram of an embodiment of step 268 of method 200, wherein a data slot may be assigned to a requestor. Step 268 may begin at step 280, where it is determined if requestor has a high priority. If it is determined that the requestor has a high priority, then step 282 may involve determining if a high priority user is on the satellite communication channel. If, at step 282, it is determined that a high priority user is on the satellite communication channel, then step 268 may proceed to step 284. Step 284 may involve assigning a data slot having a first data slot size to the requestor. In one implementation, each requestor may only be assigned one data slot. If it is determined that a high priority user is not on the satellite communication channel, then step 268 may proceed to step 286, where a data slot having a second data slot size is assigned to the requestor. The second data slot size may be larger than the first data slot size. As an example, slots sizes may be determined according to data type, priority, and/or number of users on the channel.

Referring back to step 280, if the requestor does not have a high priority, then step 288 may involve determining if a low number of users are presently on the satellite communication channel. A low number of users may be any number of users less than the maximum number of users. If a low number of users are on the satellite communication channel, then step 268 may proceeds to step 286, where a data slot having a second slot size is assigned to the requestor. If, at step 288, it is determined that a low number of users are on the satellite communication channel, then step 268 may proceeds to step 290. Step 290 may involve a determination whether the data to be transmitted by the requestor requires a low-bandwidth. As an example, a low-bandwidth may be any bandwidth that is less than half of the bandwidth capacity of the satellite communications channel. However, in other implementations, low-bandwidth may refer to any bandwidth that is less than the bandwidth capacity of the satellite communication channel. Various types of information can be supported by the channel, including voice, video, and data. If the information to be transmitted is high-bandwidth information, such as video, step 268 may proceed to step 286 to assign a data slot having a second (larger) slot size to the requestor. If the data to be transmitted does require a low-bandwidth, such as email messages, then step 292 may involve, assigning a data slot having a first (smaller) data slot size to the requestor.

Step 268 may primarily be used in the initial stages of granting a requestor access to the satellite communication channel. However, step 268 may be implemented at various times throughout method 200 to dynamically adjust the data slot size assigned to any particular user of the communications channel to maximize the efficiency and effectiveness of the transmission capabilities of the satellite communications channel. As an example, data slot sizes may be dynamically adjusted based upon the number of requestors accessing the satellite communications channel, the priority of the requestors accessing the satellite communications channel, and/or the data type to be transmitted by the requestor on the satellite communication channel.

Figure 7:
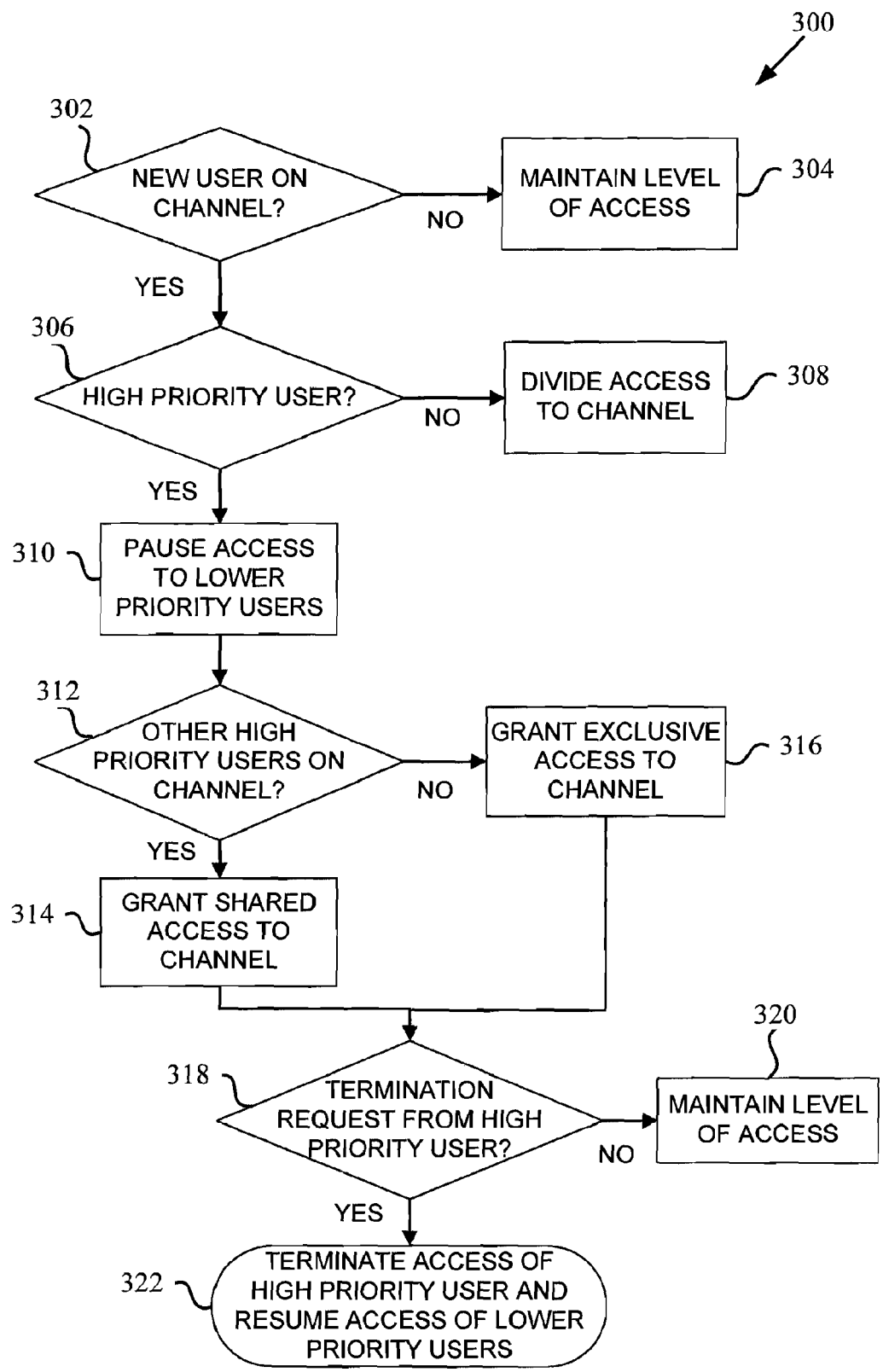
FIG. 7 shows a flow diagram of an embodiment of the step of monitoring access to the satellite communication channel according to an embodiment of the method for controlling multi-user TCP/IP access over a satellite communication channel.

FIG. 7 shows flow diagram of an embodiment of step 300 of method 200. Step 300 may begin at step 302, where it is determined if a new user is on the satellite communication channel. This step may involve a determination whether a new user has gained access to the channel. If a new user is not on the satellite communication channel, step 304 involves maintaining the current user level of access to the satellite communication channel, meaning no change to each user's level of access has occurred. Such level of access to the satellite communication channel may continue until a new user is granted access to the channel or a user terminates access to the channel. If instead, at step 302 it is determined that a new user is on the satellite communication channel, step 306 may involve determining whether the new user has a high priority. If it is determined that the new user does not have a high priority, step 308 involves dividing the level of access to the satellite communication channel among the users of the satellite communication channel, wherein each user may share the same level of access to the channel. Such level of access to the satellite communication channel may continue until a new user is granted access to the channel, a high priority user is granted access to the channel, or a user terminates access to the channel. If the new user does have a high priority, step 300 may proceed to step 310, where the access of lower priority users to the satellite communication channel is paused. The term "lower priority users" may refer to users of the satellite communication channel having priority levels less than high priority. For example, lower priority users may refer to users having medium and low priority.

Following step 310, step 312 may involve determining if another high priority user is on the satellite communication channel. If another high priority user is on the satellite communication channel, step 314 may involve granting the new user shared access to the satellite communication channel with the high priority users on the satellite communication channel. If another high priority user is not on the satellite communication channel, then step 316 may involve granting the new user exclusive access to the satellite communication channel. Such access to the satellite communication channel may continue until a new high priority user is granted access to the channel or the high priority user terminates access to the channel.

Following steps 314 or 316, step 300 may proceed to step 318, where it is determined if a termination request has been received from a high priority user. A termination request may be transmitted from a user or may automatically occur due to a lack of activity by the user. For example, the method for controlling multi-user TCP/IP access may be configured to require a user data request to be received by a controller within a certain time frame. If the controller does not receive such a request, the controller can terminate the user from the network and proceed to grant access to another user ready to transmit data. If a termination request has not been received step 320 may involve maintaining the current level of access to the users of the satellite communication channel. Such level of access to the satellite communication channel may continue until a new user is granted access to the channel, a high priority user is granted access to the channel, or a user terminates access to the channel. If, at step 318, it is determined that a termination request has been received from a high priority user, step 300 may continue to step 320. Step 320 may involve terminating the high priority user's access to the satellite communication channel and resuming access of the lower priority users to the satellite communication channel. In one implementation, step 320 involves resuming access of the lower priority users with no loss of information previously transmitted along the network.

The described embodiments are to be considered in all respects as illustrative and not restrictive. The invention is not limited to the particular embodiments described herein, but is capable of many embodiments with variations, modifications, and applications different than those described, without departing from the scope of the following claims.

We claim:

1. A method for controlling multi-user TCP/IP access comprising the steps of:
    receiving at least one request from at least one requestor for TCP/IP data transmission over a satellite communication channel, the requestor having a predetermined priority, wherein the satellite communication channel uses a TDMA controller and is a half-duplex, low-bandwidth, ultra-high frequency communication channel having a bandwidth ranging from about 9600 baud to about 38 kbps and a latency ranging from about 150 ms to about 180 ms;
    determining that the request for TCP/IP data transmission has not collided with a separate request for TCP/IP data transmission and accepting the request for TCP/IP data transmission;
    determining a number of users on the satellite communication channel;
    granting the requestor access to the satellite communication channel based on the requestor's predetermined priority and the number of users on the satellite communication channel; and
    assigning a data slot to the requestor, the data slot having a data slot size based upon the requestor's predetermined priority, the number of users on the satellite communication channel, and a bandwidth requirement of data to be transmitted.

2. The method for controlling multi-user TCP/IP access of claim 1 further comprising the step of dynamically adjusting the data slot size based upon one or more additional requestors accessing the satellite communication channel, the priority of the additional requestors accessing the satellite communication channel, and the data type to be transmitted by the additional requestors on the satellite communication channel.

3. The method for controlling multi-user TCP/IP access of claim 2, wherein the step of granting the requestor access to the satellite communication channel comprises the steps of:
   determining if the requestor has a high priority;
   if the requestor has a high priority, then determining if another high priority user is on the satellite communication channel;
   if another high priority user is on the satellite communication channel, then granting the requestor access to the satellite communication channel, wherein the access to the satellite communication channel is shared among the requestor and the another high priority user, and assigning a data slot to the requestor;
   if another high priority user is not on the satellite communication channel, then granting the requestor exclusive access to the satellite communications channel;
   if the requestor does not have a high priority, then determining if a high priority user is on the satellite communication channel;
   if a high priority user is on the satellite communication channel, then denying the requestor access to the satellite communication channel, else, determining if the maximum number of users are on the satellite communication channel; and
   if the maximum number of users are on the satellite communication channel, then denying the requestor access to the satellite communication channel, else, granting the requestor access to the satellite communication channel, wherein the access to the satellite communication channel is shared among the requestor and lower priority users, and assigning a data slot to the requestor.

4. The method for controlling multi-user TCP/IP access of claim 3, wherein the step of assigning a data slot to the requestor comprises the steps of:
   determining if the requestor has a high priority;
   if the requestor has a high priority, then determining if another high priority user is currently on the satellite communication channel;
   if another high priority user is currently on the satellite communication channel, then assigning a first data slot size to the requestor, else, assigning a second data slot size to the requestor;
   if the requestor does not have a high priority, then determining if a low number of users are currently on the satellite communication channel;
   if a low number of users are currently on the satellite communication channel, then assigning the second data slot size to the requestor, else, determining if the data to be transmitted by the requestor requires low-bandwidth; and
   if the data to be transmitted by the requestor does not require low-bandwidth, then assigning the second data slot size to the requestor, else, assigning the first data slot size to the requestor, wherein the first data slot size is less than the second data slot size.

5. The method for controlling multi-user TCP/IP access of claim 1 further comprising the step of monitoring access to the satellite communication channel based on the requestor's predetermined priority and the number of users on the satellite communication channel.

6. The method for controlling multi-user TCP/IP access of claim 5, wherein the step of monitoring access to the satellite communication channel comprises the steps of:
   determining if a new user is on the satellite communication channel;
   if a new user is not on the satellite communication channel, maintaining the current user level of access to the satellite communication channel;
   if a new user is on the satellite communication channel, determining if the new user has a high priority; and
   if the new user does not have a high priority, then dividing the level of access to the satellite communication channel among the users of the satellite communication channel, wherein each user shares the same level of access to the satellite communication channel, else, pausing the access of lower priority users to the satellite communication channel.

7. The method for controlling multi-user TCP/IP access of claim 6 further comprising the steps of:
   determining if another high priority user is on the satellite communication channel;
   if another high priority user is on the satellite communication channel, then granting the new user shared access to the satellite communication channel with the high priority users on the satellite communication channel; and
   if another high priority user is not on the satellite communication channel, then granting the new user exclusive access to the satellite communication channel.

8. The method for controlling multi-user TCP/IP access of claim 7 further comprising the steps of:
   determining if a termination request has been received from a high priority user;
   if a termination request has been received from a high priority user, then terminating the access of the high priority user to the satellite communication channel and resuming access of the lower priority users to the satellite communication channel; and
   if a termination request has not been received from a high priority user, then maintaining the current level of access to the users of the satellite communication channel.

9. The method for controlling multi-user TCP/IP access of claim 8 wherein the step of resuming access of the lower priority users to the satellite communication channel includes resuming access without loss of information.

10. The method for controlling multi-user TCP/IP access of claim 1, wherein the at least one request for TCP/IP data transmission is a request involving transmission of voice data.

11. The method for controlling multi-user TCP/IP access of claim 1, wherein the at least one request for TCP/IP data transmission is a request involving transmission of video data.

12. A method for controlling multi-user TCP/IP access comprising the steps of:
   receiving at least one request from at least one requestor for TCP/IP data transmission over a satellite communication channel;
   determining whether the at least one request for TCP/IP data transmission has collided with a separate request for TCP/IP data transmission;
   if the at least one request for TCP/IP data transmission has not collided with a separate request for TCP/IP data transmission, then accepting the at least one request for TCP/IP data transmission, else, temporarily denying access to the satellite communication channel;
   determining the priority of the requestor and the number of users on the satellite communications channel;
   determining the access to the satellite communication channel of the requestor based on the priority of the requestor and the number of users on the satellite communication channel, the determination comprising the steps of:

determining if the requestor has a high priority;

if the requestor has a high priority, then determining if another high priority user is on the satellite communication channel;

if another high priority user is on the satellite communication channel, then granting the requestor access to the satellite communication channel, wherein the access to the satellite communication channel is shared among the requestor and the another high priority user, and assigning a data slot to the requestor;

if another high priority user is not on the satellite communication channel, then granting the requestor exclusive access to the satellite communications channel;

if the requestor does not have a high priority, then determining if a high priority user is on the satellite communication channel;

if a high priority user is on the satellite communication channel, then denying the requestor access to the satellite communication channel, else, determining if the maximum number of users are on the satellite communication channel; and if the maximum number of users are on the satellite communication channel, then denying the requestor access to the satellite communication channel, else, granting the requestor access to the satellite communication channel, wherein the access to the satellite communication channel is shared among the requestor and lower priority users, and assigning a data slot to the requestor wherein the step of assigning a data slot to the requestor comprises the steps of:

determining if the requestor has a high priority, if the requestor has a high priority, then determining if another high priority user is currently on the satellite communication channel, if another high priority user is currently on the satellite communication channel, then assigning a first data slot size to the requestor, else, assigning a second data slot size to the requestor, if the requestor does not have a high priority, then determining if a low number of users are currently on the satellite communication channel, if a low number of users are currently on the satellite communication channel, then assigning the second data slot size to the requestor, else, determining if the data to be transmitted by the requestor requires low-bandwidth, and if the data to be transmitted by the requestor does not require low-bandwidth, then assigning the second data slot size to the requestor, else, assigning the first data slot size to the requestor, wherein the first data slot size is less than the second data slot size; and monitoring access to the satellite communication channel based on the priority of the requestor and the number of users on the satellite communication channel.

13. The method for controlling multi-user TCP/IP access of claim 12 further comprising the step of dynamically adjusting the data slot size based upon one or more additional requesters accessing the satellite communication channel, the priority of the additional requestors accessing the satellite communication channel, and the data type to be transmitted by the additional requestors on the satellite communication channel.

14. The method for controlling multi-user TCP/IP access of claim 12, wherein the step of monitoring access to the satellite communication channel comprises the steps of:

determining if a new user is on the satellite communication channel;

if a new user is not on the satellite communication channel, maintaining the current user level of access to the satellite communication channel;

if a new user is on the satellite communication channel, determining if the new user has a high priority; and if the new user does not have a high priority, then dividing the level of access to the satellite communication channel among the users of the satellite communication channel, wherein each user shares the same level of access to the satellite communication channel, else, pausing the access of lower priority users to the satellite communication channel.

15. The method for controlling multi-user TCP/IP access of claim 14 further comprising the steps of:

determining if another high priority user is on the satellite communication channel;

if another high priority user is on the satellite communication channel, then granting the new user shared access to the satellite communication channel with the high priority users on the satellite communication channel; and if another high priority user is not on the satellite communication channel, then granting the new user exclusive access to the satellite communication channel.

16. The method for controlling multi-user TCP/IP access of claim 15 further comprising the steps of:

determining if a termination request has been received from a high priority user;

if a termination request has been received from a high priority user, then terminating the access of the high priority user to the satellite communication channel and resuming access of the lower priority users to the satellite communication channel without loss of information; and if a termination request has not been received from a high priority user, then maintaining the current level of access to the users of the satellite communication channel.

17. A method for controlling multi-user TCP/IP access comprising the steps of:

receiving at least one request from at least one requestor for TCP/IP data transmission over a half-duplex, low-bandwidth, ultra-high frequency satellite communication channel using a TDMA controller;

determining whether the at least one request for TCP/IP data transmission has collided with a separate request for TCP/IP data transmission;

if the at least one request for TCP/IP data transmission has collided with a separate request for TCP/IP data transmission, then accepting the at least one request for TCP/IP data transmission, else, temporarily denying access to the satellite communication channel;

determining if the requestor has a high priority;

if the requestor has a high priority, then determining if another high priority user is on the satellite communication channel;

if another high priority user is on the satellite communication channel, then granting the requestor access to the satellite communication channel, wherein the access to the satellite communication channel is shared among the requestor and the another high priority user, and assigning a data slot to the requestor;

if another high priority user is not on the satellite communication channel, then granting the requestor exclusive access to the satellite communications channel;

if the requestor does not have a high priority, then determining if a high priority user is on the satellite communication channel;

if a high priority user is on the satellite communication channel, then denying the requestor access to the satellite communication channel, else, determining if the maximum number of users are on the satellite communication channel;

if the maximum number of users are on the satellite communication channel, then denying the requestor access to the satellite communication channel, else, granting the requestor access to the satellite communication channel, wherein the access to the satellite communication channel is shared among the requestor and lower priority users, and assigning a data slot to the requestor; and monitoring access to the satellite communication channel based on the priority of the requestor and the number of users on the satellite communication channel wherein the step of assigning a data slot to the requestor comprises the steps of:

determining if the requestor has a high priority, if the requestor has a high priority, then determining if another high priority user is currently on the satellite communication channel, if another high priority user is currently on the satellite communication channel, then assigning a first data slot size to the requestor, else, assigning a second data slot size to the requestor, if the requestor does not have a high priority, then determining if a low number of users are currently on the satellite communication channel, if a low number of users are currently on the satellite communication channel, then assigning the second data slot size to the requestor, else, determining if the data to be transmitted by the requestor requires low-bandwidth, and if the data to be transmitted by the requestor does not require low-bandwidth, then assigning the second data slot size to the requestor, else, assigning the first data slot size to the requestor, wherein the first data slot size is less than the second data slot size.

18. The method for controlling multi-user TCP/IP access of claim 17 further comprising the step of dynamically adjusting the data slot size based upon one or more additional requesters accessing the satellite communication channel, the priority of the additional requestors accessing the satellite communication channel, and the data type to be transmitted by the additional requestors on the satellite communication channel.

* * * * *